United States Patent Office 3,434,561
Patented Mar. 25, 1969

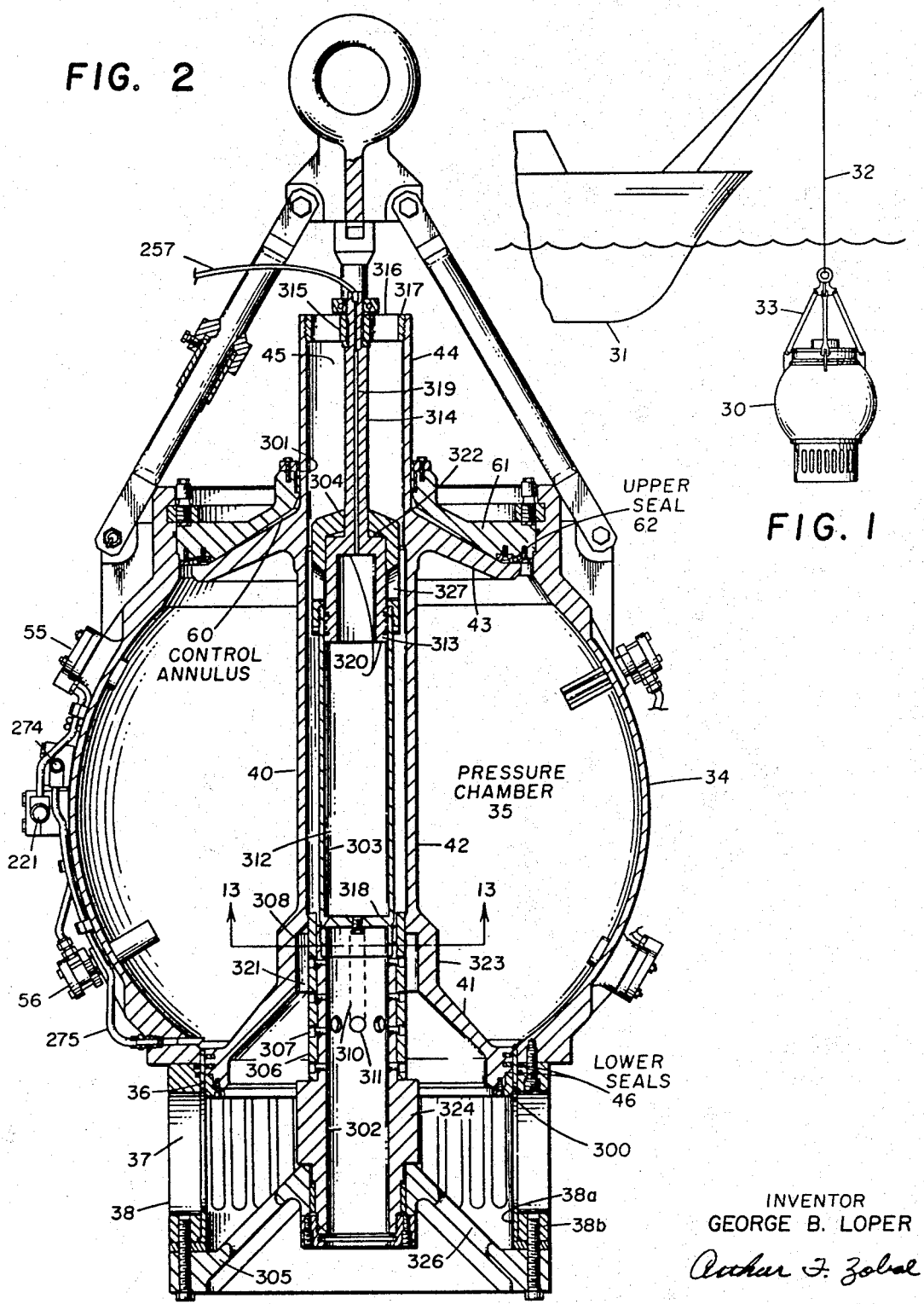

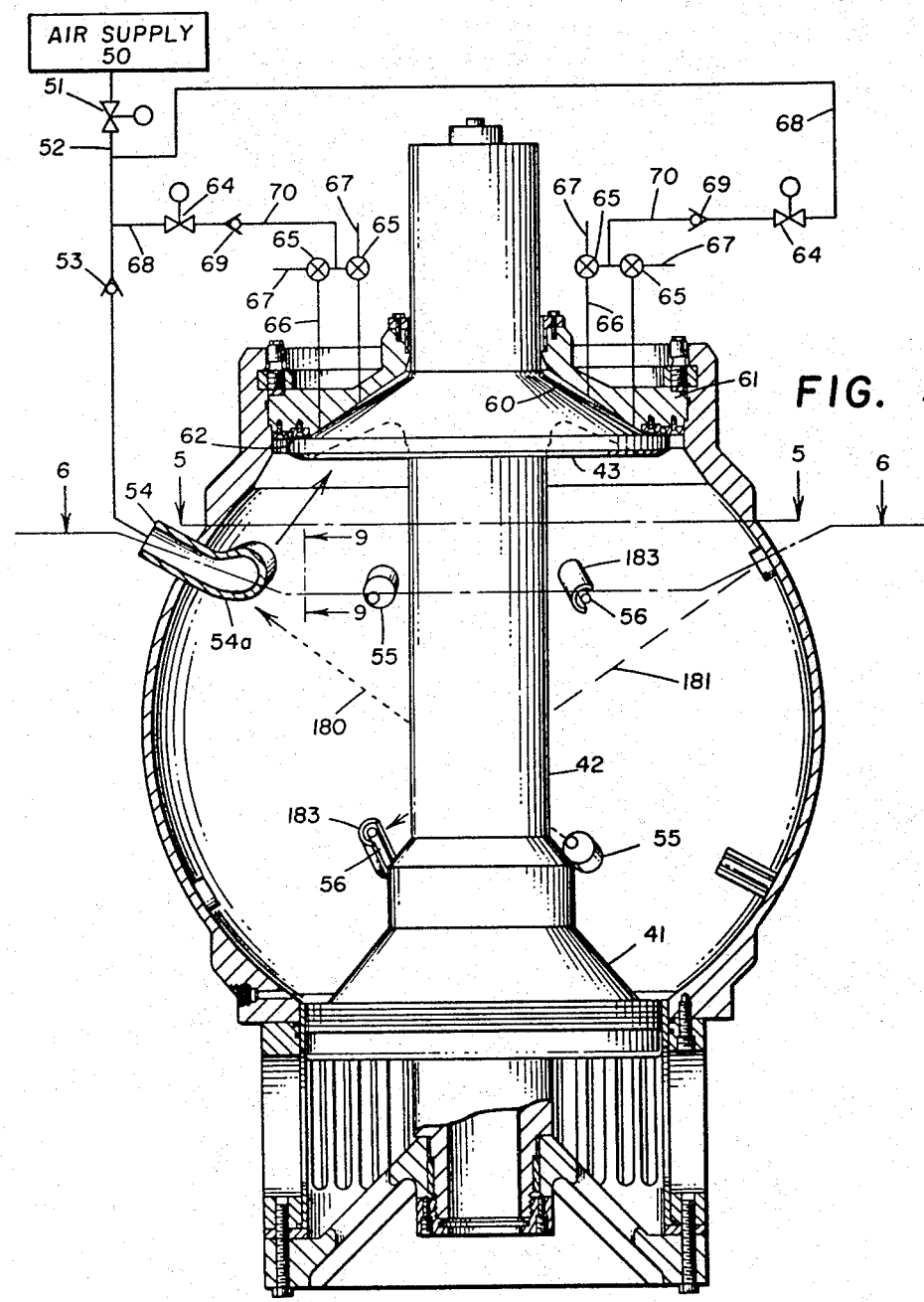

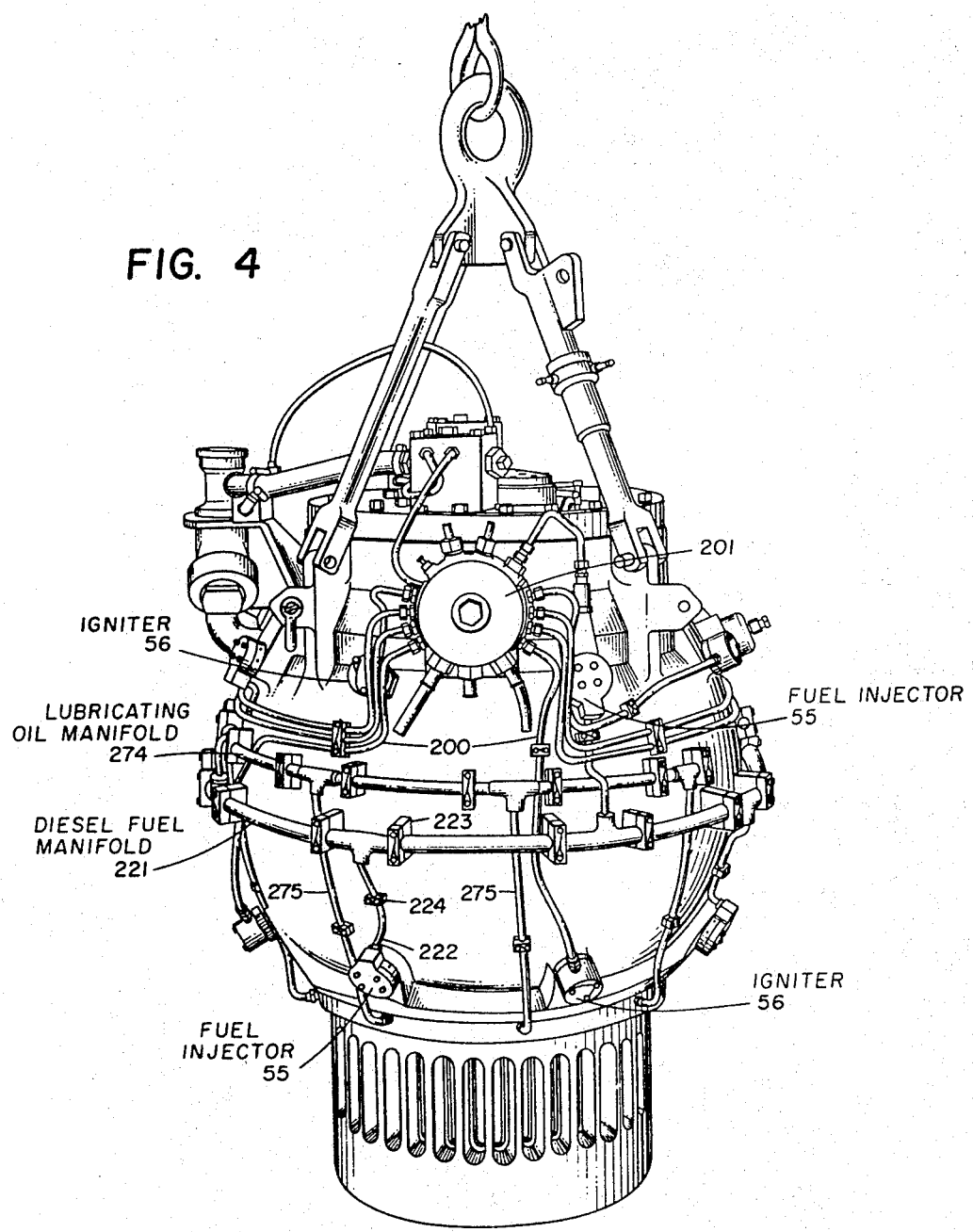

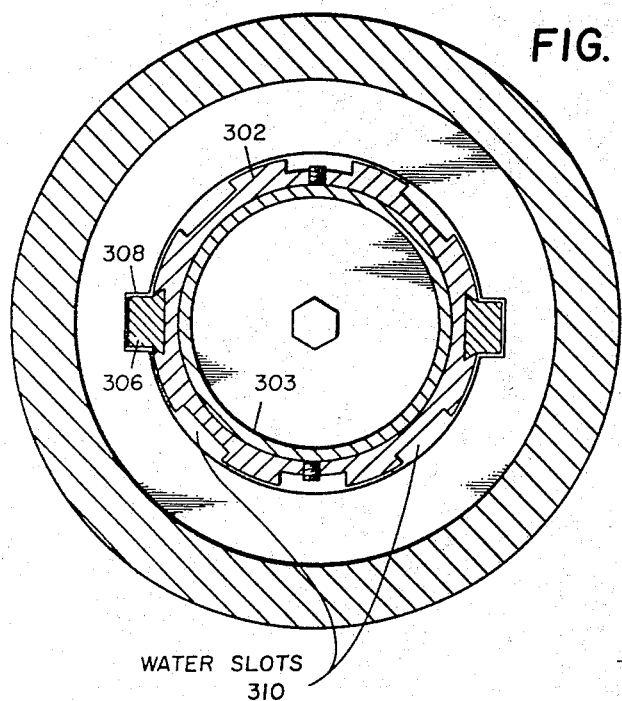
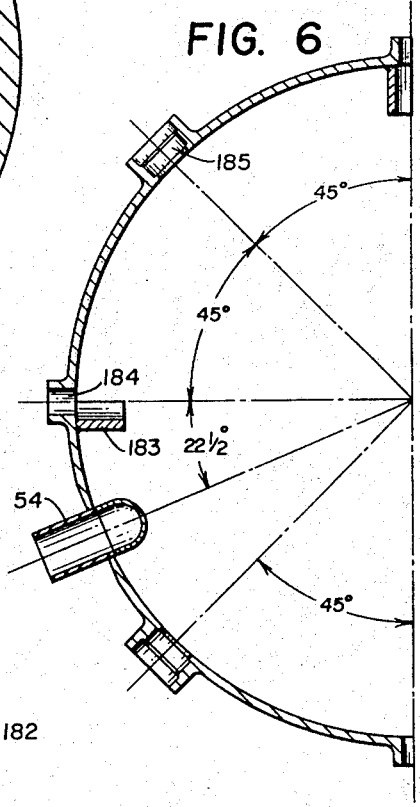
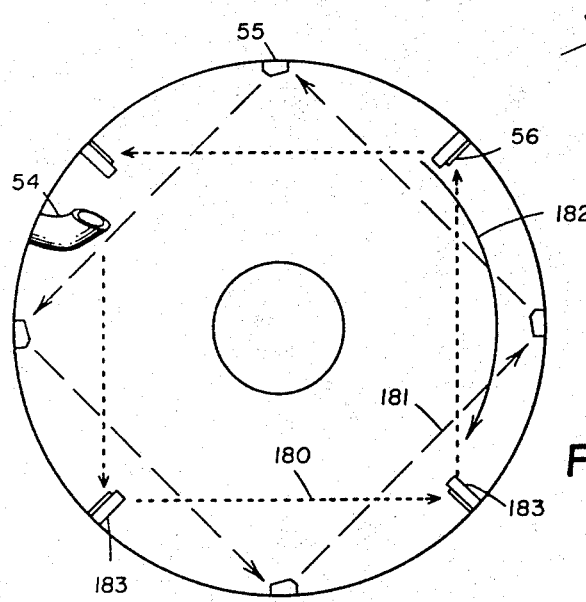

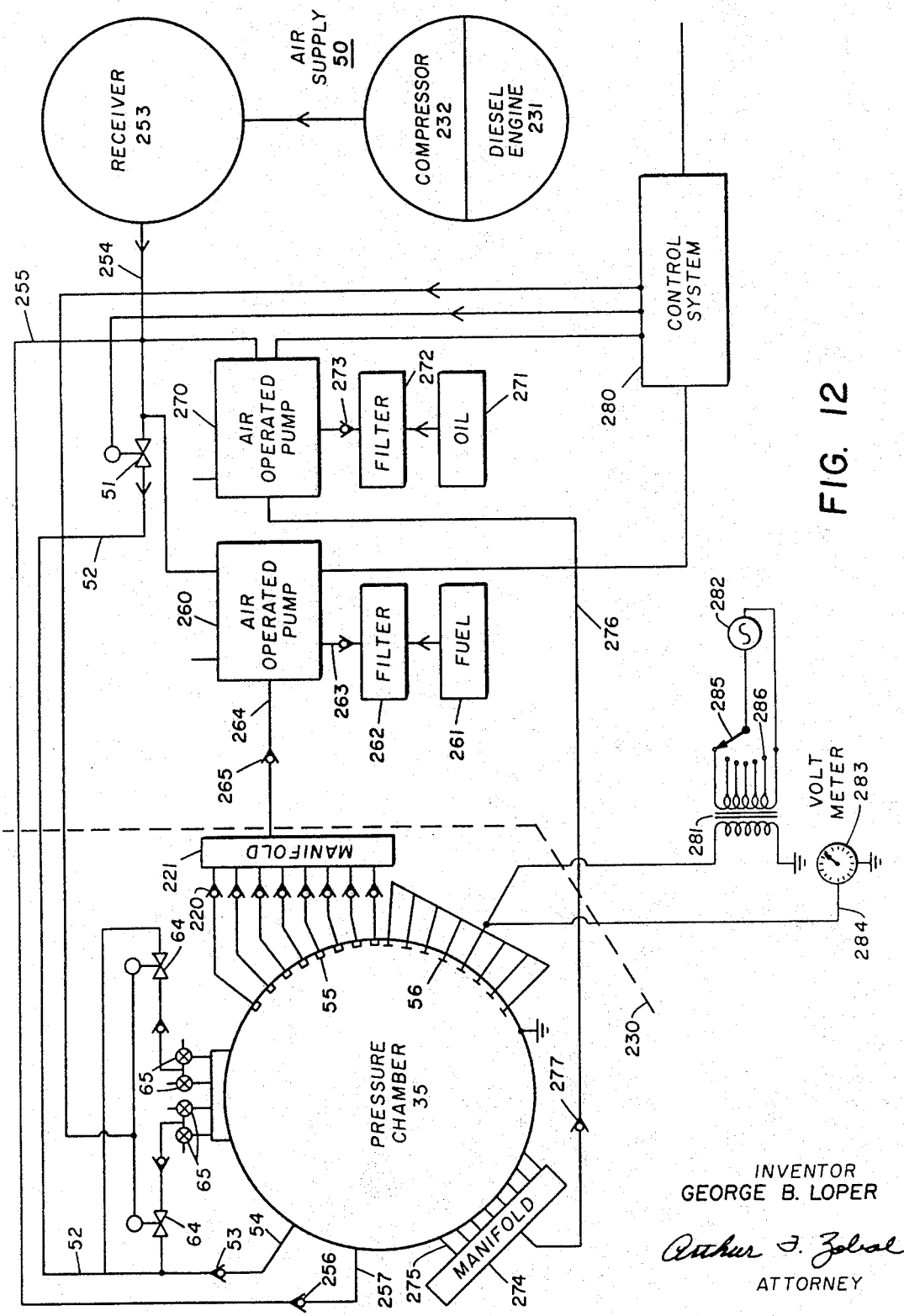

3,434,561
FUEL MIXING AND IGNITION SYSTEM IN PNEUMATIC ACOUSTIC SOURCE
George B. Loper, Duncanville, Tex., assignor to Mobil Oil Corporation, a corporation of New York
Filed Aug. 28, 1967, Ser. No. 663,663
Int. Cl. G10k *11/00*
U.S. Cl. 181—.5      14 Claims

ABSTRACT OF THE DISCLOSURE

The specification discloses a repetitive acoustic source having a chamber in which an air-diesel fuel mixture is ignited to form high pressure gasses which are rapidly released through a port by a quick-acting valve to generate an acoustic pulse in water. The fuel mixing and ignition system comprises an arrangement for injecting air in a swirling path in the chamber and a plurality of diesel fuel injectors and igniters alternately located in two spaced planes. Shields are provided to shield each igniter from the direct air to reduce cooling of the igniters. Each injector injects diesel fuel toward an igniter in an opposite plane on a side unobstructed by an associated shield.

BACKGROUND OF THE INVENTION

This invention relates to a fuel mixing and ignition system in a pneumatic acoustic source for generating acoustic pulses repetitively in water for marine seismic operations.

In United States patent application Ser. No. 534,130, filed Mar. 14, 1966, by George B. Loper, now Patent No. 3,397,755, and assigned to the same assignee as the of the present invention, there is disclosed a repetitive pneumatic acoustic source for marine seismic operations and which comprises a rigid chamber having an outlet port which is opened and closed by a fast-acting valve. In operation, the valve is moved to close the port and the chamber is pressurized with high gas pressure. The valve then is actuated to open the port to allow the pressurized gas to be released rapidly into the water to generate an acoustic pulse. This cycle is repeated periodically to generate repetitive acoustic pulses in water.

In one embodiment disclosed, there are provided air and fuel injection means and igniter means for pressurizing the chamber. Air and fuel are injected into the chamber to form a combustible mixture which is ignited to form hot gases of increased pressure. When a desired maximum pressure is obtained, the quick-acting valve is actuated to release the gases into the water to generate an acoustic pulse.

SUMMARY OF THE INVENTION

In accordance with the present invention, the air injection means is positioned to inject air in a desired flow path in the chamber. The ignition means is located in the flow path and in addition has shields positioned adjacent thereto and on one side to shield the ignition means from the direct air to reduce cooling, thereby avoiding erratic firing. The fuel injection means is positioned to inject combustible fuel toward the ignition means at a side thereof unobstructed by the shields.

In the embodiment disclosed, the chamber is substantially circular in cross section. The air injection means is positioned to inject air into the chamber in an initial direction offset from the central axis of the chamber whereby air flows in a swirling flow path around the chamber. The ignition means comprises a plurality of igniters located at spaced angular positions in the chamber around the enclosing wall structure. A shield is positioned adjacent each of the igniters from one side thereof in the path of the air flowing toward the igniters. The fuel injection means comprises a plurality of spaced fuel injectors, each positioned to inject combustible fuel toward one of the igniters at a side thereof unobstructed by an associated shield.

The igniters and associated shields and fuel injectors are located in the chmber in two spaced planes. Each of the two planes has a plurality of fuel injectors and igniters located therein and alternately spaced around the chamber. Each fuel injector is positioned to direct fuel toward an igniter located in the other plane to obtain uniform distribution of the fuel in the chamber and hence an optimum pressure.

The igniters are electric igniters coupled together in parallel and continuously energized by a source of current located at the tow boat employed for towing the acoustic source in water. As an appreciable voltage drop occurs in the current supply cables, a monitor is employed for monitoring the voltage supplied to the igniters. If one or more of the igniters burn out, the voltage at the power supply is reduced to keep the voltage on the remaining igniters at normal value and prevent them from burning out due to excessive voltage.

BRIEF DESCRIPTION OF THE DRAWINGS

FIGURE 1 illustrates a pneumatic acoustic source in the environment in which it is to be used;
FIGURE 2 is a cross-sectional view of the acoustic source and its quick-acting valve;
FIGURE 3 is a cross-sectional view of the acoustic source showing a side view of the quick-acting valve in the pressure chamber, a fuel injection and burning system in the chamber, and a schematic illustration of the equipment employed for operating the source;
FIGURE 4 is a detailed exterior view of one side of the acoustic source;
FIGURE 5 illustrates the air-inject conduit and fuel injectors and igniters viewed from the position 5—5 of FIGURE 3 showing only the outline of the exterior structure of the source and of the quick-acting valve;
FIGURE 6 is a cross-sectional view of FIGURE 3 taken along the lines 6—6 with the quick-acting valve removed;
FIGURE 9 is an enlarged view of a portion of FIGURE 3 taken along the lines 9—9;
FIGURE 12 is a schematic diagram of the acoustic source and instrumentation used to control the source;
and
FIGURE 13 is an enlarged cross-sectional view of FIGURE 2 taken along the lines 13—13.

Operation of acoustic source

Figure 10:
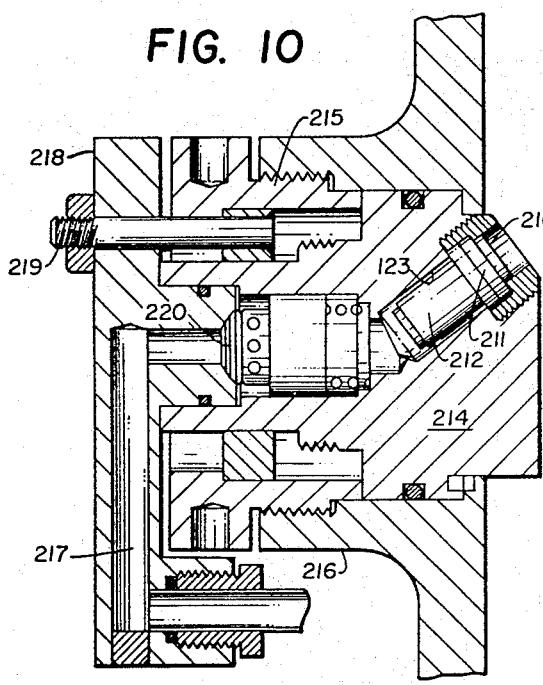
FIGURE 10 is a detailed cross-sectional view of one of the fuel injectors.

Referring now to FIGURE 1, the acoustic source 30 to which the present invention is directed is shown supported in water from a boat 31 by a cable arrangement 32 and supporting arms 33. As can be seen from the cross-sectional view of FIGURE 2, the acoustic source comprises enclosing wall structure 34 forming a pressure chamber 35 and which has a port at the lower end to be coupled to water. The outlet port comprises aperture 36 formed at the lower end of enclosing wall structure 34 and a plurality of laterally extending slots 37 extending through cylinder 38. A quick-opening, spool-shaped valve 40 is provided for opening and closing the outlet port. When the valve is in a closed position, the chamber is presssurized with high gas pressure. At a desired time, the valve 40 is actuated for sudden downward movement to allow the high pressure gas to escape rapidly into the water by way of the outlet port to generate an acoustic pulse.

As illustrated in FIGURES 2 and 3, valve 40 comprises a lower release piston or rim 41, interconnecting tubular member 42, and an upper or valve control rim 43. Tubular member 42 has an upper extension 44 and an aperture 45 extending axially therethrough. The valve 40 is supported for axial movement from a closed position, as shown in FIGURE 2, to a downward open position whereby lower rim 41 is positioned near the lower end of cylinder 38. When the valve 40 is moved to a closed position, the outlet port is sealed by lower piston ring seals 46 coupled to lower rim 41. In this position, the chamber 35 is pressurized by an arrangement including air supply 50, solenoid controlled valve 51, conduit 52, check valve 53, and main air inlet 54. In addition, a plurality of fuel injectors 55 is provided for injecting fuel into the chamber to form a combustible mixture with the compressed air. This mixture is ignited by a plurality of igniters 56 to form hot gases of high pressure within the chamber. This arrangement will be described more thoroughly hereinafter.

In the valve's closed position, a control annulus 60 is formed between the top surface of control rim 43 and the upper chamber structure 61 of the source. Upper seal 62, coupled to the chamber structure 61, contacts the upper surface of control rim 43 to seal the annulus from high gas pressure in the main chamber 35. Annulus 60 normally is maintained at a low pressure when the valve 40 is closed by an arrangement including normally closed solenoid valves 64 and shuttle valves 65, which vents annulus 60 to the water by way of passageways 66, valves 65, and vents 67. The area of the control rim 43 within the upper seal 62 is greater than the area of release rim 41 within the lower seal 46. Thus, a net upward force is applied to the quick-opening valve maintaining it in a closed position as the chamber 35 is pressurized.

The fast-acting valve 40 is actuated to release the pressurized gas from the chamber by increasing the pressure in control annulus 60. This is done by simultaneously opening solenoid valves 64, of a dual triggering system, to allow air to flow from conduit 52 to valves 65 by way of conduit 68, valves 64, check valves 69, and passageways 70. The air causes shuttle valves 65 to close vents 67 for flow to annulus 60 through passageways 66. The increase in pressure in annulus 60 causes valve 40 to move downward to a position where the top surface of the control rim 43 disengages the upper seal 62. When this occurs, the high gas pressure in the chamber 35 acts upon the top surface of the control rim 43 to upset the balance of force and rapidly move the quick-opening valve 40 downwardly to allow the high pressure gas in the chamber 35 to be released immediately to the water by way of aperture 36 and slots 37 to generate an acoustic pulse.

DETAILED DESCRIPTION OF THE INVENTION

Referring now to FIGURES 2-5, there will be described in detail the fuel mixing and ignition system for pressurizing the main chamber 35 and to which the present invention is directed. Four diesel fuel injectors 55 and four electric igniters 56 are alternately spaced and located in a first plane near the top of the source. Similarly, four diesel fuel injectors 55 and four electric igniters 56 are located alternately in a second plane near the bottom of the source. The fuel injectors 55 and igniters 56 are located at positions whereby diesel fuel from each fuel injector 55 is sprayed toward an associated igniter. In the embodiment disclosed, four upper fuel injectors 55 spray fuel toward four lower igniters 56, respectively, and the lower fuel injectors 55 spray fuel toward the four upper igniters, respectively. In FIGURES 3 and 5, the upward traveling fuel is indicated by the dotted lines 180 while the downward traveling fuel is indicated by the dashed lines 181. Each associated fuel injector-igniter pair is positioned whereby the direct line of sight between each pair is offset from the center of the chamber whereby the tubular interconnecting member 42 does not interfere with the diesel fuel sprayed toward the igniters.

The gometric arrangement of igniters and fuel injectors, as described above, has advantages since it allows a uniform distribution of fuel to be obtained in the chamber. This is desirable in order to reduce the combustion time and hence obtain a maximum or optimum pressure within the chamber.

The main air inlet 54 is positioned to direct air into the pressure chamber 35 upward toward the bottom surface of control rim 43 of the quick-acting valve 40 to one side of the tubular connecting member 42. Upon striking the bottom surface of the control rim 43, the air is deflected around the chamber in a clockwise direction and downwardly in a swirling motion. The general direction of air flow is indicated in FIGURE 5 by curved arrow 182.

The fuel injectors 55 and igniters 56 are located whereby fuel is sprayed from an injector toward an associated igniter in a direction opposite the flow of clockwise air between the injector-igniter pairs in order to enhance mixing of the diesel fuel with the air. Each igniter 56 has a shield 183 located on one side thereof between the igniter and the air flowing toward the igniter in the clockwise direction. These shields are provided to shield or protect the igniters from the cooler air injected into the chamber.

This is desirable in order to avoid erratic firing which may otherwise occur. For example, if the igniters are not shielded, the cooler air may cool the igniters to a temperature whereby ignition of the air-diesel fuel mixture may be sporadic or prevented if the temperature is lower than that necessary for ignition to take place. The shields also have advantages in that their air shielding and hence temperature maintenance function reduces the electric power needed to be applied to the igniters to maintain them at a desired high temperature necessary for ignition to take place.

Figure 8:
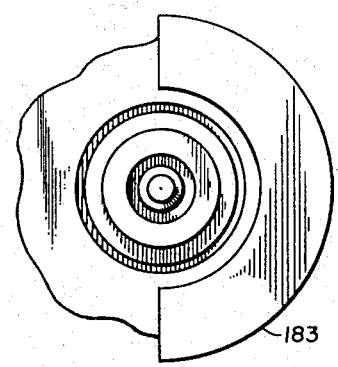
FIGURE 8 is a view of FIGURE 7 taken along the lines 8—8.
Figure 7:
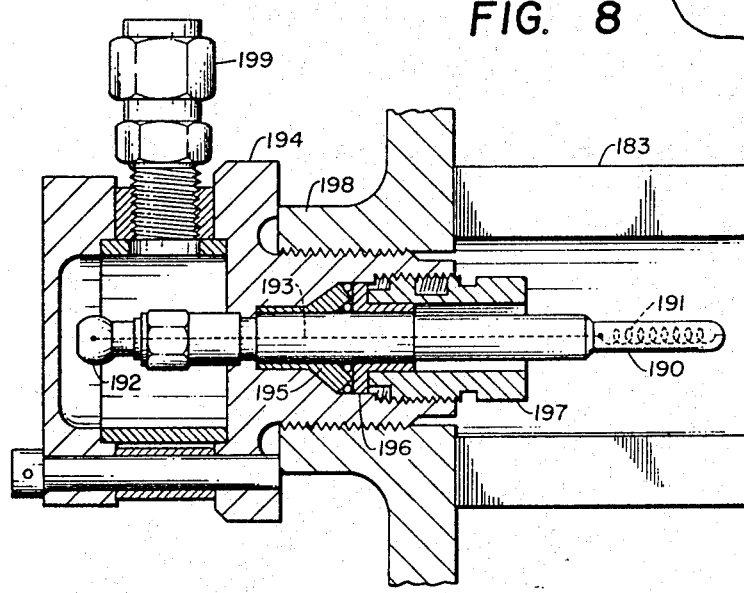
FIGURE 7 is a detailed cross-sectional view of an igniter showing its associated shield.

Referring to FIGURES 6-8, the shields 183 are metallic half cylinders welded to the interior chamber structure around apertures 184 formed through the chamber structure and through which the igniters are inserted. The shields have inner and outer diameters of 1½ and 2½ inches, respectively, and a length of 2¼ inches.

As can be seen further from FIGURE 6, the igniter apertures 184 and fuel injector apertures 185, respectively, are located 45° apart around the chamber. The main air inject 54 is located about 22.5° from one of the igniters. Referring to FIGURES 3 and 9, the main air inject 54 has a curved end 54a pointing upward toward the upper rim 43 at an angle of about 35° with respect to the central axis of the chamber. This arrangement serves two purposes, one to cool the upper rim and at the time time to allow the air to be deflected from the bottom surface of the rim 43 and around the chamber, as indicated previously.

Referring again in FIGURE 7, each igniter assembly 56 consists of a General Electric glow plug 190, No. 6A421G56, having an electrical coil 191 therein. These glow plugs have a diameter of about one-fourth inch and extend into the chamber 35 about two inches. The coil is coupled to a terminal 192 by way of electrical conductor or lead 193. The glow plug 190 is supported in member 194 by support fittings 195-197. Member 194 is threaded into fittings 198 welded to the exterior chamber structure for extension of the glow plug 190 within the chamber 35 for ignition purposes. Electrical leads extending through connector 199 are clipped to terminal 192 for providing power for energizing the coil 191. Power is supplied to the igniters by way of conduits 200 (see FIGURE 4) extending from the igniters to a junction box 201 to which electrical conductors (not shown) extend from the boat 31.

Figure 11:
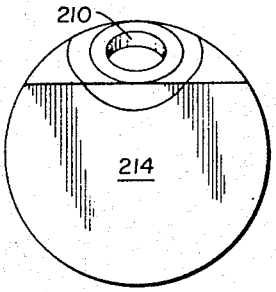
FIGURE 11 is a view of FIGURE 10 taken along the lines 11—11.

Referring to FIGURE 10, each fuel injector assembly 55 consists of an orifice 210, a nozzle 211, and a strainer 212 manufactured by Binks Manufacturing Company. The orifice 210 is identified as No. 38 (12-38) and the nozzle 211 as No. F-12-38. The orifice 210, the nozzle 211, and the strainer 212 are supported in an aperture 213 formed in member 214. Member 214 is secured within the injector aperture by member 215 threaded to fitting 216 which in turn is welded to the outer structure of the chamber. In the secured position, the end of member 214 including the orifice 210 extends into the chamber 35. The aperture 213 which supports the orifice and nozzle extends angularly through member 214 and emerges from its end face at a position offset from the center thereof whereby the diesel fuel may be injected angularly within the chamber 35 to its associated igniter. This can be understood by reference to FIGURE 11.

Diesel fuel is supplied to each injector by way of channel 217 extending through member 218 which is coupled to member 215 by bolts 219. Diesel fuel passes to the fuel injector by way of a check valve 220 which prevents high pressure gases from the chamber from passing outward thereof by way of the fuel injector system. Referring to FIGURE 4, the fuel injectors are fed with diesel fuel by an exterior manifold 221 and conduits 222 clamped to the exterior of the chamber by clamps 223 and 224, respectively.

Referring now to FIGURE 12, a brief description will be given in the manner that the source and associated equipment operate to produce periodic pulses of acoustic energy in water. In this figure, the system to the left of dashed line 230 is towed in the water during seismic operations while the equipment to the right of dashed line 230 is located and supported on the tow boat. The air supply 50 comprises a diesel engine 231, a compressor 232, and a receiver 253. The output of this receiver is coupled to the source by way of conduit 254, solenoid controlled valve 51, and conduit 52. Air for retracting the quick-acting valve is continuously applied to a retract chamber (to be described later) by way of conduit 255, check valve 256, and a flexible conduit 257. The arrangement for applying diesel fuel to the source comprises an air operated pump 260 coupled to a fuel supply 261 by way of filter 262 and check valve 263. Pump 260 applies fuel to manifold 221 by way of conduit 264 and check valve 265. An arrangement also is provided for applying lubricating oil to the lower piston of the quick-acting valve. This arrangement comprises a second air operated pump 270, coupled to an oil supply 271 by way of filter 272 and check valve 273. Pump 270 applies lubricating oil to a lubricating oil manifold 274 (see also FIGURES 2 and 4) and conducts 275 by way of conduit 276 and check valve 277.

An electrically operated control system 280 sequentially controls solenoid controlled valves 51 and 64 and in addition air operated pumps 260 and 270 during each cycle of operation for the production of an acoustic pulse. For example, assuming that the quick-acting valve 40 is in a closed position, control system 280 applies a signal to valve 51 to open this valve for a short period of time to allow high pressure air from receiver 253 to be applied to the pressure chamber 35. During the air filling operation, control system 280 also operates air operated pump 270 to pump lubricating oil into the chamber for a short period of time. Pump 270 then is inactivated and valve 51 cut off after the chamber 35 has been filled with air. Next, control system 280 actuates pump 260 to inject diesel fuel into the pressure chamber for a short period of time. Igniters 56, coupled together in parallel, are energized continuously by power applied thereto from transformer 281 and AC source 282. Thus, as soon as diesel fuel is injected into the chamber to form the combustible mixture, ignition starts and continues until a predetermined time (when the pressure no longer rises) when control system 280 actuates solenoid controlled valve 64 for a short period of time to allow air in conduit 52 to be applied to control annulus 60 to actuate the quick-acting valve 40 for releasing the high pressure gas from the pressure chamber 35 into the water to generate an acoustic pulse. After the high pressure gas is released into the water, the air applied to the retract chamber retracts the valve to its closed position and the cycle is repeated.

In one embodiment, the igniters 56 employed were each rated at 10 amps and 120 watts. The voltage applied to each igniter thus must be maintained at or below 12 volts. During operation of the source, however, one igniter may burn out thereby increasing the voltage applied to the remaining igniters. In order to prevent this increased voltage from burning out the remaining igniters and thus to preserve their lifetime, a monitor and control system is employed. A voltmeter 283 located on the tow boat is coupled by conductor 284 to the igniters near the common juncture point of their electrical leads. An operator on the boat observes the voltmeter and if the voltage increases beyond a desired point then switch 285 is moved to contact a different terminal 286 extending from transformer 281 to reduce the voltage applied from the transformer 281 to the igniters 56.

In one embodiment, the source is operated to produce acoustic pulses every six seconds. The pressure chamber 35 has a volume of nine cubic feet. Air supply 50 has a capacity to pressurize chamber 35 up to about 75 or 90 p.s.i. gauge during the air filling cycle. The temperature of the air injected through inlet 54 into chamber 35 ranges between 100°-150° F. Air conduit line 52 has an interior diameter of about two inches. Solenoid valve 51 is opened for a period of about two seconds during each filling cycle for injecting air into the chamber 35. Pressure operated pump 260 is operated effectively for about one second during each filling cycle for injecting lubricating oil. Diesel fuel pump 260 is operated effectively for about 0.5 second following the filling cycle for injecting diesel fuel. The igniters 56 are maintained at a temperature of 1000° C. in order to ignite the air-diesel fuel mixture. Burning of the combustible mixture increases the pressure within the chamber, in one embodiment, to about 500 p.s.i. gauge. The temperature of the hot gases formed within the chamber 35 upon burning the combustible mixture was determined to extend to about 1700° F. or above.

Referring again to FIGURE 2, there will be described details of the quick-acting valve structure, the valve retract mechanism, and valve deceleration system. These features also are disclosed and claimed in copending application by Bernard Otto, Repetitive Pneumatic Acoustic Source for Marine Seismic Surveying, Ser. No. 663,676, filed of even date herewith, and assigned to the same assignee as the present invention. The arrangement for supporting the quick-acting valve centrally of the exterior wall structure 34 and for movement axially thereof comprises a lower wear ring 300 coupled to the lower rim 41 and an upper bearing member 301 coupled to the upper chamber structure. Wear ring 300 slides on the inner surface of slotted cylinder 38 which is made up of an inner slotted liner 38a and an outer slotted cylinder 38b. Bearing 301 supports and guides the upper extension 44 of the quick-acting valve 40.

Extending centrally of the quick-acting valve 40 and supported rigidly with respect to the chamber wall structure 34 is a central member. This member comprises central support 302, tubular member 303, and slotted end cap 304 coupled together, respectively, and to the chamber wall structure by way of hub 305 and slotted cylinder 38. Central support member 302 has two keys 306 secured thereto by bolts 307 which cooperate with the slots 308 (see FIGURE 13) formed in the interior surface of the valve 40 for guiding the valve in its upward and downward movement. The exterior diameters of tubular member 303 and slotted end cap 304 are smaller than the interior diameter of the aperture 45 extending through the quick-acting valve 40, thereby providing a central region exposed to and containing water. Water may pass into and out of this region by way of the aperture 45 extending through the upper extension 44 of the valve 40 and by way of water slots 310 formed on the outer periphery of central support member 302. These water slots extend from the top portion of member 302 to apertures 311, the latter of which allow water to pass interiorly of member 302 intermediate its end. Thus, the central water region extends completely through the quick-acting valve 40 when it is in a closed position and cools the interconnecting member 42 from the hot temperatures generated within the pressure chamber 35.

Also located within the aperture 45 extending through the quick-acting valve 40 is a retract mechanism comprising an air chamber 312 formed by the tubular member 303 and in addition interior retract piston 313, the latter of which is rigidly coupled to the quick-acting valve 40. This coupling is by way of stem 314, rim 315, a plurality of spaced spokes 316, and rim 317. Thus, the retract piston 303 moves with the quick-acting valve 40 and is supported for sliding movement within the rigidly supported member 303. The lower end of tubular member 303 is closed by end portion 318. Pressurized air is injected into the retract chamber 312 by way of flexible conduit 257 (mentioned previously) and aperture 319 extending through stem 314. Thus, following the generation of an acoustic pulse and after the high pressure gas is released from the pressure chamber 35, the pressurized air in the retract chamber acts over the entire surface 320 of retract piston 313 and moves the piston 313 and hence the quick-acting valve 40 to the closed position.

The arrangement for decelerating the valve comprises a lower water trapped region or chamber 321 for decelerating the quick-acting valve 40 at the end of its opening movement and an upper or return water trap chamber 322 for decelerating the quick-acting valve 40 at the end of its return movement.

Lower water trap region 321 is formed as the lower rim portion 323 slides around the enlarged cylindrical portion 324 of central support 302. Water trapped in this region decelerates the valve 40. Water escapes downward through the small clearance between the exterior surface of member 324 and the interior surface of member 323. The exterior surface of member 324 is tapered toward its upper end to provide a variable orifice to obtain uniform deceleration of the valve. Upon movement of the valve 40 downward, water below the lower rim 41 passes outward and downward by way of slots 37 and apertures 326 formed in connecting hub 305.

As the quick-acting valve and hence the retract piston 313 moves downwardly, water from the annular water region within the quick-acting valve 40 flows through laterally extending apertures 327, formed in end cap 304, into the chamber region 322. Upon upward movement of the valve 40 and the retract piston 313, water trapped within this chamber decelerates the valve at the end of its return movement. It escapes through apertures 327 by way of the small clearance between the exterior surface of retract piston 313 and the interior surface of end cap 304. The exterior surface of retract piston 304 is tapered toward its upper end to provide a variable orifice to obtain uniform deceleration of the valve.

The upper seal 62 employed in the source is disclosed and claimed in copending United States application by Ellis M. Brown et al., Seal for Pneumatic Acoustic Source, Ser. No. 663,664, filed of even date herewith, and assigned to the same assignee as that of the present invention. The seal comprises a resilient elastomer O-ring and a stainless steel ring, both of which are located and held within an annular slot formed in structure 61 and surrounding the annulus 60. The elastomer O-ring is located between the walls of the slot and the steel ring, the latter of which has a lower end portion positioned to extend out of the slot downward to contact the top surface of control rim 43. This arrangement protects the elastomer O-ring from the high temperatures generated within the pressure chamber 35. Pressurized gas from the pressure chamber also is applied to one side of the elastomer O-ring for pressure sealing purposes. This pressure is applied to the O-ring by way of a labyrinth utilized to cool the high pressure gas before application to the elastomer O-ring. The labyrinth is formed in structure 61 and has passageways extending from chamber 35 to the annular slot which holds the elastomer O-ring and steel ring.

The shuttle valves 65 mentioned above are disclosed and claimed in the aforementioned application by Bernard Otto. Each valve comprises a tubular member having two open ends and a closed wall formed intermediate the ends blocking the passageway through the tubular member. The valve is supported for reciprocal movement in a conduit whose two ends are connected to passageway 70 and vent 67, respectively. Passageway 66 is connected to the conduit intermediate its ends. Apertures extend laterally through the side structure of the tubular member on each side of the wall but spaced therefrom. Normally a spring biases the tubular member to a position whereby the apertures on the side of the wall facing vent 67 are positioned over the passageway 66 thereby connecting passageway 66 and hence annulus 60 to vent 67. In this position, the wall also blocks passageway 70 from passageway 66. When valves 64 are actuated, air flows through passageway 70 and acts on the other side of the wall to move the shuttle valve toward the vent 67 to position the apertures on this latter side of the wall over passageway 66 to allow air to flow to annulus 60 for triggering purposes. In this latter position the wall in the shuttle valve blocks vent 67 from passageway 66.

What is claimed is:
1. An acoustic source for generating high energy acoustic pulses in water for exploratory purposes comprising:
wall structure forming a pressure chamber to be immersed in water and having an outlet port for releasing high pressure gas from said chamber,
movable valve means for opening and closing said outlet port,
means for injecting air in a flow path in said chamber,
ignition means located in said flow path,
said air flowing toward said ignition means predominantly from a predetermined direction,
shield means positioned in said flow path adjacent said ignition means to shield said ignition means from air flowing from said predetermined direction to reduce cooling of said ignition means,
said shield means being located adjacent said ignition means on the side facing said direction from which said air is flowing in said flow path toward said ignition means,
fuel injection means for injecting combustible fuel into said chamber for mixture with said air to form a combustible mixture for ignition to form a high gas pressure in said chamber,
said fuel injection means being positioned to inject combustible fuel toward said ignition means at a side thereof unobstructed by said shield means, and
means for actuating said valve means to move said valve means rapidly to an open position to open said outlet port to allow said high gas pressure formed in said chamber to be released rapidly from said chamber to generate an acoustic pulse in water.
2. An acoustic source for generating high energy acoustic pulses in water for exploratory purposes comprising:
wall structure forming a pressure chamber having an outlet port to be coupled to water, movable valve means for opening and closing said outlet port, means for injecting air in a flow path in said chamber, ignition means located in said flow path, said air flowing toward said ignition means predominantly from a predetermined direction, shield means positioned in said flow path adjacent said ignition means to shield said ignition means from air flowing from said predetermined direction to reduce cooling of said ignition means, said shield means being located adjacent said ignition means on the side facing said direction from which said air is flowing in said flow path toward said ignition means, fuel injection means for injecting diesel fuel into said chamber for mixture with said air to form a combustible mixture for ignition to form a high gas pressure in said chamber, said fuel injection means being positioned to inject combustible fuel toward said ignition means at a side thereof unobstructed by said shield means, means for controlling the injection of said air and said fuel to inject air and fuel into said chamber during periods when said valve means is closed, means for actuating said valve means to move said valve means rapidly to an open position to open said outlet port to allow said high gas pressure formed in said chamber to be released rapidly into the water to generate an acoustic pulse, and means for moving said valve means to a closed position following the generation of an acoustic pulse whereby acoustic pulses may be repetitively generated.

3. The acoustic source of claim 2 comprising:
means for continuously energizing said ignition means for providing ignition heat for igniting said combustible mixture formed.

4. The acoustic source of claim 2 wherein:
said means for injecting air is positioned to inject air in a swirling path in said chamber, a plurality of spaced igniters located in said chamber in said path, a shield located adjacent each igniter on a side facing the direction from which air is flowing in said swirling path toward an associated igniter, a plurality of spaced fuel injectors for injecting combustible fuel into said chamber for mixture with said air to form a combustible mixture for ignition to form a high gas pressure in said chamber.

one of each of said fuel injectors being positioned to inject combustible fuel toward one of said igniters at a side thereof unobstructed by its associated shield.

5. An acoustic source for generating high energy acoustic pulses in water for exploratory purposes comprising:
a chamber having a first end, an outlet port spaced from said first end, and enclosing wall structure therebetween defining the outer limits of a chamber region within said enclosing wall structure, the outer boundary of said chamber region being substantially circular in cross section between said first end and said outlet port, valve means supported for opening and closing said outlet port, means for injecting air in said chamber in an initial direction offset from the central axis of said chamber whereby said air flows in a swirling flow path around said chamber, a plurality of igniters located at spaced angular positions in said chamber around said enclosing wall structure, a shield positioned adjacent each of said igniters on one side thereof, said shields being located on the same side of each of said igniters around said chamber with respect to the central axis thereof and in the path of air flowing toward said igniters by way of said swirling flow path to shield said igniters from said air to reduce cooling of said igniters by said air, fuel injection means for injecting combustible fuel into said chamber for mixture with said air to form a combustible mixture for ignition to form a high gas pressure in said chamber, said fuel injection means including a plurality of injectors each positioned to inject combustible fuel toward one of said igniters at a side thereof unobstructed by an associated shield, and means for actuating said valve means to move said valve means rapidly to an open position to open said outlet port to allow said high gas pressure formed in said chamber to be released rapidly into the water to generate an acoustic pulse.

6. The acoustic source of claim 5 comprising:
means for moving said valve means to a closed position following the generation of an acoustic pulse whereby acoustic pulses may be repetitively generated, means for controlling the injection of said air and said fuel to inject air and fuel into said chamber during periods when said valve means is closed to form a high gas pressure in said chamber for release into the water to generate periodically acoustic pulses in water, said combustible fuel injected comprising diesel fuel, and means for continuously energizing said igniters for providing ignition heat for igniting said combustible mixture formed.

7. The acoustic source of claim 5 wherein said valve means includes:
structure which extends into said chamber when said valve means is closed forming an annular chamber.

8. The acoustic source of claim 7 comprising:
control means for controlling said actuating means for causing said valve to open and close periodically said outlet port, means for controlling the injection of said compressed air and said fuel to inject compressed air and fuel into said chamber during periods when said valve means is closed to form high gas pressure in said chamber for release into the water periodically to generate pulses of acoustic energy, said combustible fuel injected comprising diesel fuel, and means for continuously energizing said igniters for providing ignition heat for igniting said combustible mixture formed.

9. The acoustic source of claim 8 wherein:
said igniter means and associated shields and said fuel injectors are located between said first end and said outlet port in two spaced planes.

10. The acoustic source of claim 9 wherein:
each of said two planes has a plurality of fuel injectors and igniters located therein and alternately spaced around said chamber, each fuel injector being positioned to direct fuel toward an igniter located in a plane spaced from the plane in which said fuel injector is located.

11. An acoustic source for generating acoustic pulses in water for exploratory purposes comprising:
a chamber formed of rigid wall structure having a first end and an outlet port means spaced from said first end to be coupled to water, movable valve means supported for opening and closing said outlet port means, means for injecting air into said chamber from said first end in a swirling path around said chamber toward the region of said chamber in the vicinity of said outlet port means, a plurality of fuel injecting means disposed in spaced relation about a periphery of said chamber for introducing into said chamber a plurality of streams of combustible fuel for mixture with said air to form a combustible mixture, a pluraality of igniting means spaced one from the other and from said injecting means disposed around the periphery of said chamber for igniting said combustible mixture to form a high gas pressure in said chamber, said ignition means and said fuel injectors being loacted between said first end and said outlet port means in two spaced planes, each of said planes having a plurality of fuel injectors and ignition means located therein and alternately spaced around said chamber, each fuel injector being positioned to direct fuel toward an ignition means located in a plane spaced from the plane in which said fuel injector is located, and means for actuating said valve means after ignition of said combustible mixture suddenly to move said valve means to open said outlet port means to allow the high gas pressure in said chamber to be released rapidly into the water to generate an acoustic pulse.

12. The acoustic source of claim 11 wherein:

said valve means includes a release member supported for opening and closing said outlet port means and having structural means including a control means extending into said chamber from said release member adjacent said first end of said chamber and exposed to high gas pressure when said valve means is in a closed position, said fuel injection means and said ignition means, respectively, comprising diesel fuel injectors and igniters and in which said injectors have end portions for directing fuel into the unobstructed space of said chamber toward its associated igniter.

13. In an acoustic source for generating high energy acoustic pulses in water for exploratory purposes having:

a chamber formed of rigid wall structure for storing pressurized gas, said chamber having an outlet port means to be coupled to water, means for injecting pressurized air into said chamber, a plurality of spaced fuel injecting means for introducing combustible fuel into said chamber for mixture with said air for forming a combustible mixture, a plurality of electrical igniting means coupled electrically together in parallel and spaced one from the other and from said injecting means for igniting said combustible mixture to create a gas pressure therein substantially greater than the pressure outside said chamber at said outlet port means, valve means for rapidly releasing the pressurized gas through said outlet port means at a predetermined time when the pressure is at a high level to generate an acoustic pulse, and means for retracting said valve means to a closed position to generate periodically acoustic pulses, the method of operating said source which comprises:
continuously applying energizing current to said igniters for continuously energizing said igniters during and between each period of operation, monitoring the power applied to said igniters during the operation of said source, and
controlling the power applied to said igniters in the event that the electrical voltage at said igniters increases above a predetermined level.

14. The method of claim 13 wherein:

said power applied to said igniters is controlled by reducing the power applied to said igniters in the event the electrical voltage at said igniters increases above a predetermined level.

References Cited

UNITED STATES PATENTS

| | | | |
|---|---|---|---|
| 2,693,082 | 11/1954 | Arthur | 158—28 |
| 3,064,753 | 11/1962 | McClure | 181—.5 |
| 3,134,423 | 5/1964 | Smith | 158—91 |
| 3,249,177 | 5/1966 | Chelminski | 181—.5 |
| 3,256,952 | 6/1966 | Crider et al. | 181—.5 |
| 3,289,784 | 12/1966 | Cassand et al. | 181—.5 |

BENJAMIN A. BORCHELT, *Primary Examiner.*

GERALD H. GLANZMAN, *Assistant Examiner.*